United States Patent
Buendgen et al.

(10) Patent No.: US 10,757,082 B2
(45) Date of Patent: Aug. 25, 2020

(54) TRANSFORMING A WRAPPED KEY INTO A PROTECTED KEY

(71) Applicant: International Business Machines Corporation, Armonk, NY (US)

(72) Inventors: Reinhard T. Buendgen, Tuebingen (DE); Hendrik Brückner, Böblingen (DE)

(73) Assignee: International Business Machines Corporation, Armonk, NY (US)

( * ) Notice: Subject to any disclaimer, the term of this patent is extended or adjusted under 35 U.S.C. 154(b) by 269 days.

(21) Appl. No.: 15/901,938

(22) Filed: Feb. 22, 2018

(65) Prior Publication Data
US 2019/0260718 A1   Aug. 22, 2019

(51) Int. Cl.
| H04L 29/06 | (2006.01) |
| G06F 9/455 | (2018.01) |
| H04L 9/08  | (2006.01) |
| H04L 9/32  | (2006.01) |
| H04L 9/14  | (2006.01) |

(52) U.S. Cl.
CPC ...... H04L 63/0478 (2013.01); G06F 9/45558 (2013.01); H04L 9/0822 (2013.01); H04L 9/0869 (2013.01); H04L 9/0897 (2013.01); H04L 9/14 (2013.01); H04L 9/3213 (2013.01); H04L 9/3242 (2013.01); *G06F 2009/45587* (2013.01); *G06F 2009/45595* (2013.01)

(58) Field of Classification Search
CPC . H04L 63/0478; H04L 9/0822; H04L 9/3242; H04L 9/0897; H04L 9/0869; H04L 9/3213; H04L 9/14; H04L 63/068; H04L 63/061; G06F 9/45558; G06F 2009/45587; G06F 2009/45595
USPC ........................................................ 713/171
See application file for complete search history.

(56) References Cited

U.S. PATENT DOCUMENTS

| 8,656,482 | B1 * | 2/2014 | Tosa ........................ H04L 63/08 |
|           |      |        | 713/153 |
| 9,923,923 | B1 * | 3/2018 | Sharifi Mehr .......... H04L 63/04 |
| 10,333,903 | B1 * | 6/2019 | Campagna ............. H04L 63/061 |
| 2008/0104673 | A1 * | 5/2008 | O'Connor ............... G06F 21/53 |
|           |      |        | 726/4 |

(Continued)

FOREIGN PATENT DOCUMENTS

CN          105528239 A     4/2016

*Primary Examiner* — Aravind K Moorthy
(74) *Attorney, Agent, or Firm* — Daniel C. Housley

(57) ABSTRACT

A method for transforming a wrapped key token into a protected key may be provided. The protected key is protected by a volatile master key kept in the firmware of a virtual server. The method comprises creating an isolated virtual server that maintains a master key. The virtual server and the isolated virtual server share parts of same hypervisor's firmware. The method further comprises configuring an association—using a shared secret—between the virtual server and the isolated virtual server. The method further comprises establishing a secure communication channel between the virtual server and the isolated virtual server, based on the secret, and providing to the virtual server the wrapped key token comprising a random key wrapped by the isolated virtual server master key, and providing to the virtual server, in response to submitting the wrapped key token, via a second service, the protected key.

20 Claims, 8 Drawing Sheets

(56) References Cited

U.S. PATENT DOCUMENTS

| | | | | |
|---|---|---|---|---|
| 2008/0127348 | A1* | 5/2008 | Largman | G06F 21/56 726/24 |
| 2009/0241194 | A1* | 9/2009 | Thomas | G06F 21/53 726/24 |
| 2010/0199351 | A1* | 8/2010 | Protas | G06F 21/577 726/25 |
| 2012/0290702 | A1* | 11/2012 | Vincent | G06F 9/45558 709/223 |
| 2013/0061293 | A1* | 3/2013 | Mao | G06F 21/53 726/4 |
| 2013/0227303 | A1* | 8/2013 | Kadatch | G06F 21/554 713/193 |
| 2013/0275967 | A1* | 10/2013 | Jenne | G06F 21/62 718/1 |
| 2014/0208097 | A1* | 7/2014 | Brandwine | G06F 21/44 713/156 |
| 2014/0208111 | A1* | 7/2014 | Brandwine | H04L 63/0869 713/171 |
| 2014/0208442 | A1* | 7/2014 | Mooring | G06F 9/45533 726/30 |
| 2014/0244785 | A1* | 8/2014 | Potlapally | H04L 67/10 709/217 |
| 2015/0007175 | A1* | 1/2015 | Potlapally | G06F 21/57 718/1 |
| 2015/0134953 | A1 | 5/2015 | Seaborn et al. | |
| 2015/0309832 | A1* | 10/2015 | Tu | G06F 9/45558 718/1 |
| 2015/0358161 | A1* | 12/2015 | Kancharla | H04L 63/0485 713/164 |
| 2015/0358311 | A1 | 12/2015 | Kancharla et al. | |
| 2016/0034295 | A1* | 2/2016 | Cochran | G06F 9/45558 718/1 |
| 2016/0132345 | A1* | 5/2016 | Bacher | G06F 9/45558 718/1 |
| 2016/0148001 | A1* | 5/2016 | Bacher | G06F 9/45558 713/189 |
| 2016/0292442 | A1* | 10/2016 | Axnix | G06F 21/575 |
| 2017/0004001 | A1* | 1/2017 | Bacher | G06F 9/45558 |
| 2017/0005990 | A1* | 1/2017 | Birger | H04L 63/045 |
| 2017/0034001 | A1* | 2/2017 | Dagan | H04L 41/12 |
| 2017/0063547 | A1 | 3/2017 | Brandt et al. | |
| 2017/0097841 | A1* | 4/2017 | Chang | H04L 67/10 |
| 2017/0104782 | A1* | 4/2017 | Folco | H04L 63/02 |
| 2017/0132158 | A1* | 5/2017 | Axnix | G06F 12/1408 |
| 2017/0171197 | A1* | 6/2017 | Alexander | H04L 67/20 |
| 2017/0180399 | A1* | 6/2017 | Sukhomlinov | G06F 21/552 |
| 2017/0214707 | A1* | 7/2017 | Grubel | G06F 11/301 |
| 2017/0277898 | A1* | 9/2017 | Powell | G06F 21/602 |
| 2017/0372061 | A1* | 12/2017 | Penzin | G06F 21/44 |
| 2018/0019979 | A1* | 1/2018 | Bacher | G06F 21/00 |
| 2018/0095774 | A1* | 4/2018 | Atta | G06F 15/76 |
| 2018/0203681 | A1* | 7/2018 | Acharya | G06F 9/5077 |
| 2018/0210748 | A1* | 7/2018 | Kakaraparthi | G06F 9/45558 |
| 2018/0239896 | A1* | 8/2018 | Kato | G06F 12/14 |
| 2018/0295036 | A1* | 10/2018 | Krishnamurthy | H04L 41/0893 |
| 2018/0322136 | A1* | 11/2018 | Carpentier | G06F 9/44526 |
| 2019/0007209 | A1* | 1/2019 | Ruan | H04L 9/302 |
| 2019/0036704 | A1* | 1/2019 | DeVetter | G06F 3/0623 |
| 2019/0068458 | A1* | 2/2019 | Stefanov | H04L 41/5048 |
| 2019/0140831 | A1* | 5/2019 | De Lima Junior | G06F 12/1408 |
| 2019/0158536 | A1* | 5/2019 | Kraemer | H04L 63/0281 |

* cited by examiner

500

┌─────────────────────────────────────────────────────────┐
| 502 VS: request transf. the wrapped key token into prot. key |
└─────────────────────────────────────────────────────────┘
                              ↓
┌─────────────────────────────────────────────────────────┐
| 504 VS-FW: auth. req. for transf. of the wrapped key |
|     token using VSAK and send it to IVS-FW,              |
|     which forwards it to IVS                             |
| ┌─────────────────────────────────────────────────────┐ |
| | 506 IVS-FW: verifies the request authentication, | |
| |     on error – return error code                     | |
| └─────────────────────────────────────────────────────┘ |
└─────────────────────────────────────────────────────────┘
                              ↓
┌─────────────────────────────────────────────────────────┐
| 508 IVS: decrypt the WKT using IVS master key and   |
|     verify auth. tag with respect to the VSAK            |
|     of the VS it received the request from              |
| ┌─────────────────────────────────────────────────────┐ |
| | 510 IVS: if key auth. fails                     | |
| |         – return error code                          | |
| └─────────────────────────────────────────────────────┘ |
└─────────────────────────────────────────────────────────┘
                              ↓
┌─────────────────────────────────────────────────────────┐
| 512 IVS encrypts the received random key with the   |
| VSTK of the VS it received the request from and returns |
| it to the IVS-FW which sends it to the VS-FW            |
└─────────────────────────────────────────────────────────┘
                              ↓
┌─────────────────────────────────────────────────────────┐
| 514 VS-FW decrypts is using a copy of the VSTK and  |
| encrypts the result using the VS master key and sends   |
| it to the VS                                             |
└─────────────────────────────────────────────────────────┘

FIG. 5

TRANSFORMING A WRAPPED KEY INTO A PROTECTED KEY

FIELD OF THE INVENTION

The invention relates generally to a method for data protection and securing data access keys, and more specifically, to a method for transforming a wrapped key token into a protected key. The invention relates further to a system for transforming a wrapped key token into a protected key, a computing system, and a computer program product.

BACKGROUND

Securing content—in particular in enterprise computing—continues to be one of the most important topics on a CIO's (chief information officer) agenda. In the meantime, encryption of data—in particular in cloud computing environments—has become standard now. However, in order to re-access the data—e.g., the encrypted data—a decryption key is required. Therefore, the decryption key becomes the security bottleneck. Once a decryption key has gotten into the wrong hands, the previously protected data may no longer be protected, because unwanted access via a stolen key may be possible. Central management of encryption and decryption keys may be one option to address the problem; however, it may also represent a vulnerability, because it may provide an obvious target for intruders.

In some environments, data access keys in the form of protected keys are used to secure the data access keys themselves. Protected keys are keys encrypted by a volatile key encryption key (KEK) of a CPU/firmware (FW) which cannot be accessed in plaintext form by the operating system and which becomes invalid at certain events (e.g., system boot).

Currently, (re-)generating protected keys in a secure manner requires a hardware security module (HSM) that is tightly coupled to the CPU/FW which may be implemented together with an IBM z System and an IBM Crypto Express adapter. However, tightly coupled HSMs are expensive and are restricted in number, e.g., by a limited number of I/O slots for crypto adapters in a computing system, in particular in mainframe computing systems. Thus, there continues to be a need for a trusted management system for protected keys, without a central point of control which may be vulnerable to intrusion attempts.

SUMMARY

According to one aspect of the present invention, a method for transforming a wrapped key token into a protected key may be provided. The protected key may be protected by a volatile master key kept in firmware of a virtual server. The method may comprise creating an isolated virtual server that maintains an isolated virtual server master key, and creating a virtual server. The virtual server and the isolated virtual server may run together with the same hardware firmware, e.g., a hypervisor. The hardware firmware may maintain a volatile virtual server master key for each virtual server.

The method may further comprise configuring an association between the virtual server and the isolated virtual server. The association may provide a secret shared by the firmware of the virtual server and the isolated virtual server. Furthermore, the method may comprise establishing a secure communication channel between the virtual server and the isolated virtual server based on the secret, providing to the virtual server via a first service a wrapped key token comprising a random key wrapped by the isolated virtual server master key, and providing to the virtual server, in return to submitting the wrapped key token via a second service, a protected key. Thereby, the protected key may correspond to the random key which was wrapped by the isolated virtual server master key.

According to another aspect of the present invention, a related system for transforming a wrapped key token into a protected key may be provided.

Furthermore, embodiments may take the form of a related computer program product, accessible from a computer-usable or computer-readable medium providing program code for use, by, or in connection with, a computer or any instruction execution system. For the purpose of this description, a computer-usable or computer-readable medium may be any apparatus that may contain means for storing, communicating, propagating, or transporting the program for use, by, or in connection with, the instruction execution system, apparatus, or device.

BRIEF DESCRIPTION OF THE SEVERAL VIEWS OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Preferred embodiments of the invention will be described, by way of example only, and with reference to the following drawings:

FIG. 5 shows a block diagram of an embodiment of a flowchart of requesting a wrapped key token to be transformed into a protected key.

DETAILED DESCRIPTION

Figure 1:
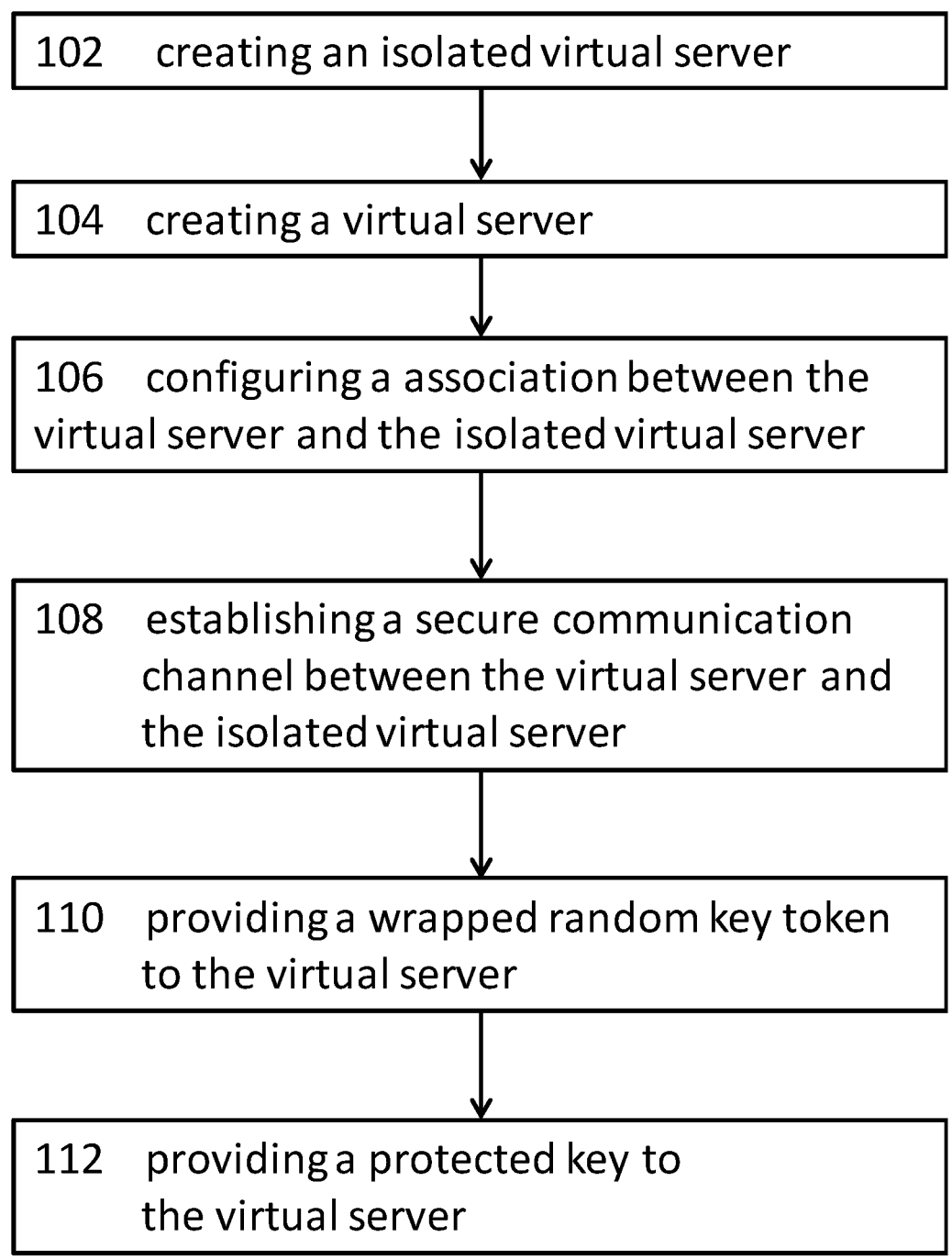
FIG. 1 shows a block diagram of an embodiment of the inventive method for transforming a wrapped key token into a protected key.

In the context of this description, the following conventions, terms and/or expressions may be used:

The term 'wrapped key token' may denote a randomly generated key, in particular generated by the isolated virtual server, which may be wrapped by the isolated virtual server master key. The key token may represent a data structure comprising a random key—e.g., a key randomly generated—and an authentication tag.

The term 'protected key' may denote a data access key used for a related virtual server. The protection may be achieved by a virtual server master key—or, in other words, a virtual server key encryption key—maintained by the firmware of the virtual server. Hence, the data access key may not be stored in plaintext, but always in an encrypted or wrapped form. It may only be used in plaintext—after a decryption—for an actual data access. However, the encryption key for the data access key may be volatile—e.g., only valid for the lifetime of the related virtual machine. On the other side, the data continue to be encrypted with the data access key. Here is the core motivation for transforming a wrapped key token into a protected key, wherein the protection of the data access key is done by a different virtual server master key after every boot/reboot of the virtual server.

The term 'volatile master key' may denote a master key which may be forgotten after a shutdown of the virtual server and then randomly generated after a reboot.

The term 'firmware' may denote a type of computer program that may provide the low-level control for the device specific hardware. In the context of this application, the firmware may be embedded into, or closely related to, the CPU of the computer server system. It may not be alterable by a user, but it may be changed by the vendor of the hardware system. Parts of the firmware may be stored in persistent form, e.g., it may "survive" a reboot; other parts of the firmware (e.g., variables describing dynamic objects like virtual servers) may be volatile and not be retained across a shutdown/reboot cycle. The firmware may control a special behavior of a CPU and may be used to provide firmware portions to virtual servers.

The term 'isolated virtual server' may denote a specialized virtual server running on a hypervisor provided or executed by a firmware of a server. The notion 'isolated' may denote that none of the components of the isolated virtual server may be accessible by any user or operator. The isolated virtual server may be sealed against unauthorized/unauthenticated outside access. Its outside communication may either go to a (protected) persistent storage for the isolated virtual server master key and/or to a portion of the system firmware dedicated to the isolated virtual server responsible for a communication with a configuration system and for a secure communication with the firmware of the virtual server(s). The IBM z Secure Service Containers are an example of such an isolated virtual server.

The term 'isolated virtual server master key' may denote a unique master key related to and managed by the isolated virtual server. This unique master key may be stored in a secure way by a persistent storage such that the unique master key is also available after a reboot of the complete server.

The term 'virtual server master key' may denote a virtual server—not isolated virtual server—master key controlled and managed by the firmware of the virtual server. It may also be denoted as virtual server key encryption key (KEK). It may be newly regenerated at each reboot of the virtual server.

The term 'association' may denote a relationship in terms of a joint communication channel between the virtual server and isolated virtual server.

The term 'secret' may denote a tag, expression, or key "injected" into the system from an operator at boot time of the computer/server system using a configuration console. This secret may be replaced regularly during the operation of the hardware server.

The term 'secure communication channel' may denote an uncompromisable communication channel which may, e.g., be built by a jointly accessible memory from both the virtual server and the isolated virtual server and/or their related firmware, respectively and not observable by any other entity. The secure communication may be enabled by an authentication tag and a transport key, used for a symmetric or asymmetric communication.

It may be noted that the term 'virtual server' and 'isolated virtual server may be used in the sense of a virtual machine running on a hypervisor. A virtual machine (VM) may thus be an emulation of a computer system, e.g., a server. Virtual machines are based on computer architectures and provide functionality of a physical computer. Their implementations may involve specialized hardware, software, or a combination thereof.

It may also be noted that a clear differentiation should be made between the virtual server—of which a plurality may exist on the computer (hardware) server—and the isolated virtual server which may exist as a single instance (e.g., not as a plurality). The isolated virtual server may not be accessible by any operator or user directly; however, the virtual server(s) may represent a plurality of virtual machines accessible by users and which may be operated using different operating systems to support different applications.

The proposed method for transforming a wrapped key token into a protected key may offer multiple advantages and technical effects:

The proposed method—as well as the related system—does not require hardware-based crypto-adapters or devices for managing protected keys for data encryption and/or data decryption. Only one persistent isolated virtual server master key may be required for managing a virtually unlimited number of protected keys for virtual machines on a computing server. The persistent master key may be managed using special hardware protection mechanisms and/or trusted platform modules.

Because there is no central management point for all protected keys of all virtual machines of a system, an attacker's options to steal encryption and/or decryption keys are limited, because the central instance that may be used to trace the protected keys in traditional implementations is not required any longer. Additionally, only limited changes may be required to the firmware of a large-scale system to support the proposed concept of transforming a wrapped key token into a protected key. Further, a virtual server on the large-scale system—namely the firmware relating to the virtual server—services itself regarding the virtual server's respective protected key for accessing data.

In particular, the problem that protected keys may be forgotten after a reboot of a virtual server if a central instance does not have a copy of the protected key may be overcome. The two-stage process of requesting a wrapped key token from the central unique and secure instance—the isolated virtual server, which deletes the wrapped key token and the random key immediately after providing it to the virtual server—and the transformation of the wrapped key token into a protected key solves the highly secure key management requirement elegantly.

The following, additional embodiments of the method—which are also applicable to the related system—will be described:

According to a preferred embodiment of the method, the first service may comprise requesting the wrapped key token by the virtual server from the isolated virtual server, creating the random key by the isolated virtual server, and determining an authentication tag for the random key using the secret shared by the virtual server and the isolated virtual server.

Additionally, this embodiment may comprise wrapping both the random key and the authentication tag with the isolated virtual server master key, sending the random key and the authentication tag wrapped with the isolated virtual server master key from the isolated virtual server to the virtual server, and receiving, as a wrapped key token, the random key and the authentication tag wrapped with the isolated virtual server master key by the virtual server.

These features may describe the first step—e.g., the first service provided by the isolated virtual server—of the complete two-staged method in more detail.

According to a further preferred embodiment of the method, the second service may comprise providing the wrapped key token to the virtual server firmware, composing, by the virtual server firmware, a request consisting of the wrapped key token and a request authentication tag computed using the shared secret, and sending the request to the isolated virtual server.

Furthermore, this embodiment may comprise decrypting, by the isolated virtual server, the wrapped key token resulting in the random key and the authentication tag, verifying that the request authentication tag and the original authentication tag were created based on the same secret, sending, by the isolated virtual server, the random key to the virtual server firmware which is a portion of the hardware firmware, and encrypting, by the virtual server firmware, the random key with the volatile virtual server master key resulting in the protected key.

Thus, these features may describe the second step—e.g., the second service provided by the isolated virtual server—of the complete two-staged method in more detail.

According to one advantageous embodiment of the method may further comprise sending, by the isolated virtual server, the random key to the virtual server firmware may comprise encrypting the random key with a virtual server transport key that may be derived from the secret, and decrypting by the virtual server firmware the encrypted random key with the virtual server transport key.

In fact, both the virtual server transport key, as well as the transport key, used by the firmware of the isolated virtual server, may be derived from the secret. A symmetrical or an asymmetrical transport encryption may be used between the firmware of the isolated virtual server and the virtual server. The transport encryption may guarantee one option of a secure communication channel between the virtual server and the isolated virtual server.

According to another advantageous embodiment of the method, the computation of the request authentication tag and the authentication tag for the random key may be performed using an authentication key derived from the secret. The secret—which may be injected into the process by an operator and/or a configuration and monitoring system, e.g., manually—may play a substantial role in ensuring a secure transmission between the isolated virtual server and the virtual server.

According to one preferred embodiment of the method, the random key may be erased on the isolated virtual server after the wrapped key token may be sent to the virtual server. Thus, the isolated virtual server may "forget" the randomly generated key. This may save space in the limited resources of the isolated virtual server and/or a hardware security module. Additionally, no central place for the random keys for all virtual servers, running on the hardware server, may exist. This may enhance the data protection.

According to one additional preferred embodiment of the method, the virtual server master key—in contrast, or in addition, to the isolated virtual server master key—may be generated every time the virtual server is booted. Also, this process may be based on a random generation. Hence, the virtual server master key may be useless for an intruder after a reboot of the virtual server.

According to another embodiment of the method, the wrapped key token, once received from the isolated virtual server, may be persistent in the virtual server or a related persistent storage. Hence, the wrapped key token may survive a reboot; however, the key token may not be unwrapped in the virtual server because the decryption key—e.g., the isolated virtual server master key—may not be available on the virtual server.

According to one permissive embodiment of the method, the isolated virtual server master key may be kept persistent in a hardware security module, e.g., a secure location/device. It may be noted that the isolated virtual server master key may never be transmitted to the virtual server. The key may stay exclusively in the isolated virtual server environment.

According to another permissive embodiment of the method, the isolated virtual server master key may be virtual server specific, e.g., unique for each of a plurality of virtual servers running on the hypervisor of the underlying hardware system. Alternatively, one of the isolated virtual server master keys may be used for a subgroup of the plurality of virtual machines; e.g., all virtual machines of one user may share the same isolated virtual server master key.

According to one alternative embodiment—alternative to the first optional embodiment described above—of the method, the first service may comprise requesting the wrapped key token by the virtual server from the isolated virtual server, creating the random key by the isolated virtual server, wrapping the random key with the isolated virtual server master key specific to the virtual server, sending the random key wrapped with the isolated virtual server master key specific to the virtual server from the isolated virtual server to the virtual server, and receiving, as wrapped key token, the random key wrapped with said isolated virtual server master key specific to the virtual server by the virtual server. This embodiment may represent a slightly less restrictive version of the method.

According to one further alternative embodiment—extending the embodiment of the previous paragraph—the second service may comprise sending the wrapped key token in an authenticated form from the virtual server to the isolated virtual server, the isolated virtual server decrypting the wrapped key token resulting in the random key using the isolated virtual server master key specific to the virtual server (e.g., the server that authenticated the wrapped key token), the isolated virtual server sending the random key to the virtual server firmware which is a portion of the hardware firmware, and encrypting, by the virtual server firmware, the random key with the volatile virtual server master key resulting in the protected key.

These features of the second service may represent an embodiment that may be a slightly less restricted version of the method described in the context of the first service in the paragraph above.

In the following, the described figures relate to one or more specific embodiments of the general inventive concept.

FIG. 1 shows a block diagram of an embodiment of the method 100 for transforming a wrapped key token into a protected key, which is protected by a volatile master key kept in the firmware of a virtual server. The method 100 comprises creating, at 102, an isolated virtual server during a startup process of the hardware server. The isolated virtual server maintains an isolated virtual server master key which may be stored on a secure persistent storage, but which may otherwise never leave the isolated virtual server.

The method further comprises creating, at 104, a virtual server, wherein the virtual server and the isolated virtual server run on the same hardware firmware, e.g., a hypervisor or an extended hypervisor. The hardware firmware maintains a volatile virtual server master key—in contrast to the persistent isolated virtual server master key—for each virtual server. The virtual server master key is not accessible by code, e.g., an operating system, running in the virtual server. The virtual server master key may be a randomly generated virtual server master key which is newly (and randomly) generated at every boot time of the virtual server.

The method 100 comprises further configuring, at 106, an association between the virtual server and the isolated virtual server. The association provides a secret shared by the firmware relating to the virtual server and relating to the isolated virtual server. The secret may originate from a console input at boot time of the computer server/system. Alternatively, the secret may be generated by a special controlling and monitoring software system.

Additionally, the method 100 comprises establishing, at 108, a secure communication channel between the virtual server and the isolated virtual server. The secure channel may be based on the information of the association between the virtual server and the isolated virtual server. It may be based on the secret, and its characteristic may be maintained or reestablished over a new boot of the system hardware. Physically, a secure communication channel may be implemented via a shared memory accessible from both sides (e.g., from both the isolated virtual server and the virtual server).

Furthermore, the method 100 comprises providing, at 110, to the virtual server via a first service—in particular by the isolated virtual server—a wrapped key token comprising a random key wrapped by the isolated virtual server master key. This wrapped key token may be persistent over the boot cycle of the virtual server. Thus, also after a boot/reboot of the virtual server, the wrapped key token is still accessible by the virtual server, but the key itself may not be accessible because the isolated virtual server master key is not available in the virtual server.

Moreover, the method 100 comprises providing, 112, by the isolated virtual server to the virtual server, in return to submitting the wrapped key token from the virtual server to the isolated virtual server via a second service, the protected key. Thereby, the protected key corresponds to the random key which was wrapped by the isolated virtual server master key.

Hence, also after a reboot of the virtual server, the data access key, protected by the virtual server master key, for accessing data of the virtual server continues to be available even though the isolated virtual server does not maintain or persistently store this data access key, the wrapped key token, nor the master key of the virtual server.

Figure 2:
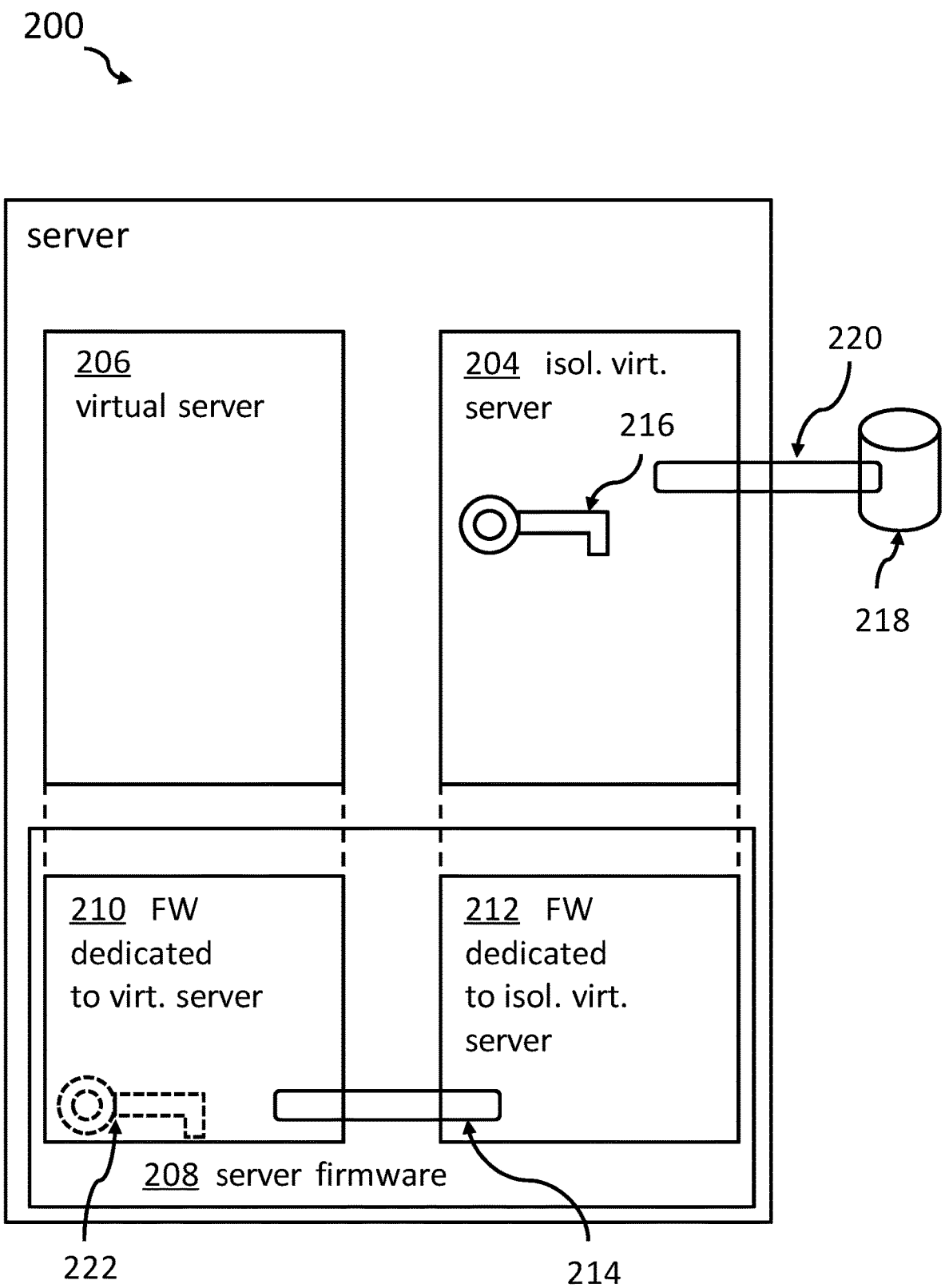
FIG. 2 shows a block diagram of an embodiment of a general set up of a server comprising the isolated virtual server and the virtual server together with a firmware.

FIG. 2 shows a block diagram of an embodiment of a general set up of components of a server 200 comprising the isolated virtual server 204 and the virtual server 206, together with a firmware layer 208. The server firmware (FW) is a hidden software layer that may be shipped as part of the hardware server. The firmware 208 may be considered to be a trusted component of the computer system 200. In particular, operating systems and/or programs running on the server 200 cannot read or write data that belongs to the firmware 208. In this case, the firmware 208, among others, implements a hypervisor—also known as a virtual machine monitor—that allows running one or more virtual servers 206. In particular, it supports to run at least one virtual server 204 that is isolated from other virtual servers on the server, e.g., the isolated virtual server 204.

This isolation means that no access to the isolated virtual server 204 is possible from any user-controlled processes. Even operators may not have access to any data in the isolated virtual server.

It may also be noted that a portion 210 of the firmware 208 is dedicated to the virtual server 206 (relationship indicated by dashed vertical lines); this portion of the firmware 208 may be denoted as firmware 210 dedicated to the virtual server 206. On the other side, there is also a portion 212 of the firmware 208 that is dedicated to the isolated virtual server 204 (relationship also indicated by vertical dashed lines).

Also shown is a secure communication channel 214 enabling a secure communication between the virtual server 206 and the isolated virtual server 204 by the respectively related dedicated firmware portions 210, 212.

Furthermore, the persistent isolated virtual server master key 216 is shown. This may be persistent even over a boot cycle of the server (hardware) system 200. For that purpose, the isolated virtual server master key 216 may be stored on a physical long-term storage 218 which may be accessible via a secure access channel 220.

Additionally, the portion 210 of the firmware 208 dedicated to the virtual server 206 may maintain a master key, (e.g., the virtual server master key 222), not to be intermixed with the isolated virtual server master key 216. This virtual server master key 222 may not be persistent over a boot cycle (or reboot) of the virtual server 206. It may be randomly generated after each boot of the virtual server 206. Hence, the virtual server master key 222 is virtual server 206 specific.

Figure 3:
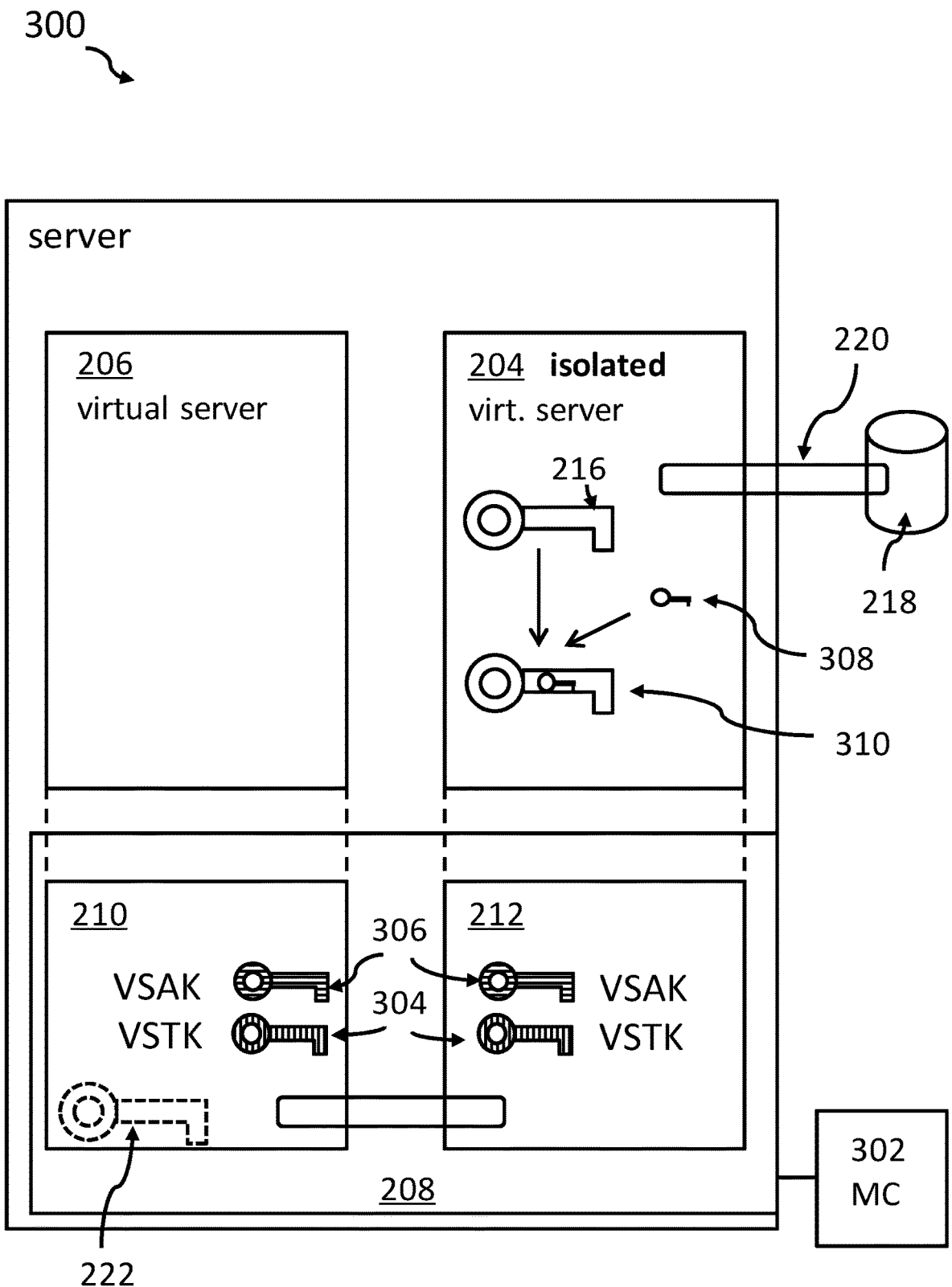
FIG. 3 shows the block diagram according to FIG. 2 in a different status with the isolated virtual server master key and the virtual server master key.

FIG. 3 shows a block diagram 300, according to the environment described in FIG. 2, e.g., in a configuration status with the isolated virtual server master key 216 and the virtual server master key 222. In this figure, a management console (MC) 302 is also shown. It is adapted for a data exchange with the server firmware 208, and thus to the virtual server firmware 210 and the isolated virtual server firmware 212.

Using the management console 302, any virtual server 206 (from a possible plurality of virtual servers) running on the server firmware 208 (e.g., in form of a hypervisor) may be configured as a client to the isolated virtual server 204. Additionally, a secret (not shown) may be made available to the virtual server firmware 210 and the isolated virtual server firmware 212. The secret (not shown) may be used to generate a virtual server transport key 304 and a virtual server authentication key 306. These two keys may be used for a secure communication between the virtual server 206 and the isolated virtual server 204, and vice versa. It may again be noted that the management console 302 does not have any access to the isolated virtual server 204 and its data structures, including the isolated virtual server master key.

Additionally, FIG. 3 shows the random key 308, and also the wrapped random key token 310 (together with the authentication tag, which is not shown).

Figure 4:
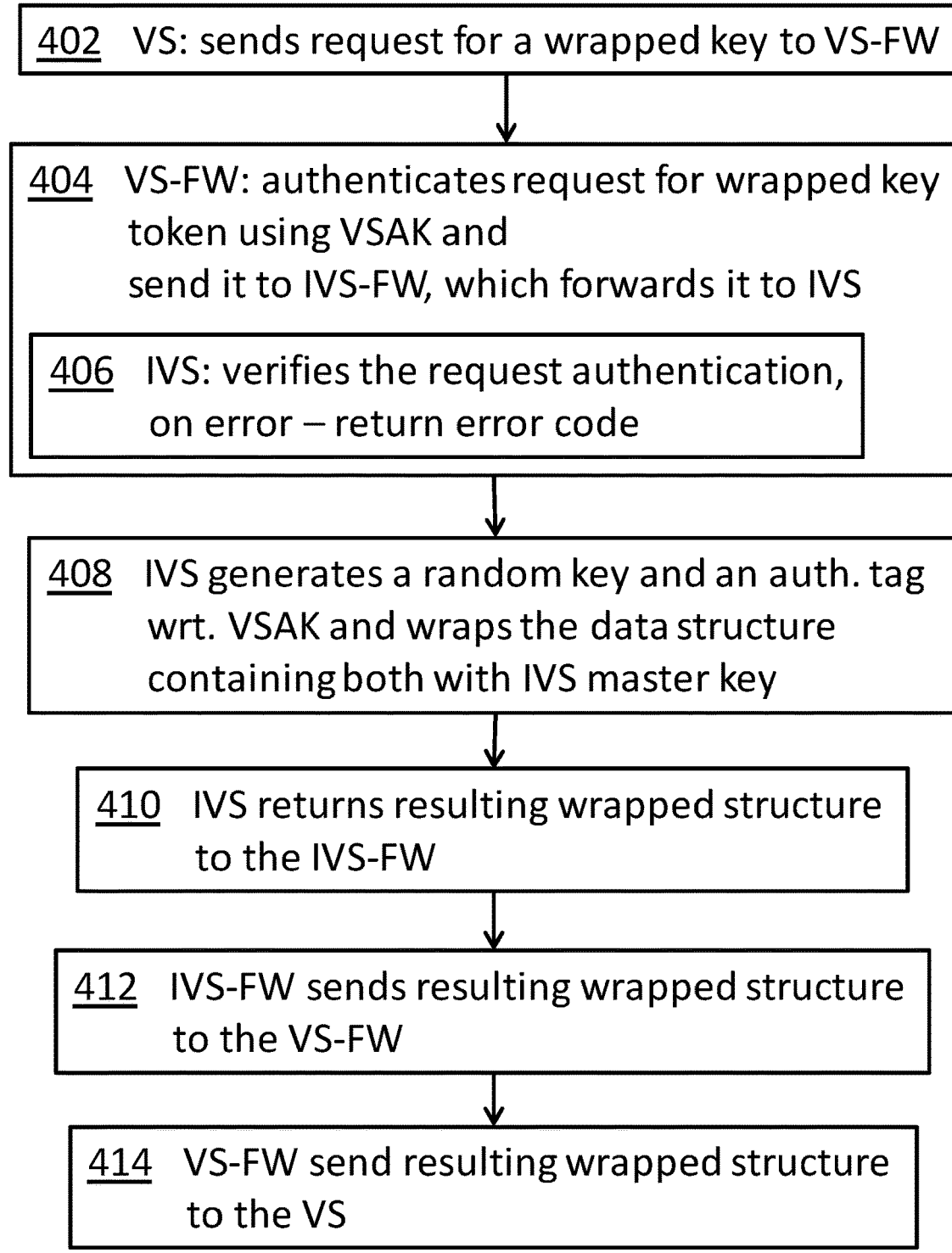
FIG. 4 shows a block diagram of an embodiment of a flowchart of a request for a wrapped key token.

FIG. 4 shows a block diagram of an embodiment of a flowchart 400 of a request for a wrapped key token. As an initial step, the virtual server sends a request, at 402, for a wrapped key token to the isolated virtual server. Next, at 404, the virtual server firmware authenticates the request for a wrapped key token using the virtual server authentication key. Once sent over the secure communication channel, the isolated virtual server firmware 212 verifies the request authentication, or returns an error code if the request cannot be authenticated, at 406.

At 408, the isolated virtual server 204 generates a random key and an authentication tag with respect to the virtual server authentication key and wraps (encrypts) a data structure containing both the random key and the authentication tag—e.g., the key token—with the isolated virtual server master key 216.

At 410, the isolated virtual server 204 returns the resulting wrapped key token to the isolated virtual server firmware 212, which in return sends, at 412, the resulting wrapped key token to the virtual server firmware 210. Finally, the virtual server firmware 210 forwards, at 414, the wrapped key token to the virtual server 206.

Thus, as a consequence of the request for the wrapped key token, this first service may provide this wrapped key token to the virtual server. The wrapped key token may be maintained persistently, e.g., over a boot cycle of the virtual server 206, e.g., on an external storage disk or similar.

FIG. 5 shows a block diagram of an embodiment of a flowchart 500 of requesting a wrapped key to be transformed into a protected key. It may be noted that this is possible, although the isolated virtual server—also denotable as the virtual key wrapping server—does not have any specific virtual server key information.

Based on the wrapped key token—once received from the isolated virtual server 204—the virtual server requests, at 502, a transformation of the wrapped key token into a protected key.

In this step, the virtual server firmware 210 authenticates, at 504, the request for transforming the wrapped key token using the virtual server authentication key and sends it to the isolated virtual server firmware 212, which in turn forwards it to the isolated virtual server 204.

As part of that process, the isolated virtual server firmware 212 verifies, at 506, the request authentication. In the event of an error condition, the method may return an error code.

The isolated virtual server 204 decrypts, at 508, the wrapped key token, using the isolated virtual server master key, and verifies the authentication tag with respect to the virtual server authentication key of the virtual server it received the request from. As part of this process, an error code may be returned, if the authentication fails, at 510.

The isolated virtual server encrypts, at 512, the received random key (which originally was created by the isolated virtual server, but not maintained there) with the virtual server transport key of the virtual server it received the request from and returns it to the isolated virtual server firmware 212, which sends it to the virtual server firmware 210.

Here, the virtual server firmware 210 decrypts, at 514, the encrypted random key using a copy of the virtual server transport key 304, encrypts the result (e.g., the original random key) using a virtual server master key 222, and sends it to the virtual server for further usage, e.g., for accessing data that have been encrypted with the random key.

Thus, the virtual server 206 may maintain a persistent protected key (e.g., persistent over a reboot of the virtual server 206) without storing the unprotected data access key in the virtual server 206. Also, the isolated virtual server may not maintain the unprotected—or protected—data access key in form of the originally generated random key. Thus, the data access key of the virtual server is always only available in form of a protected key, which is only decrypted on behalf of the virtual server by the firmware or CPU, if used for a data access.

Figure 6:
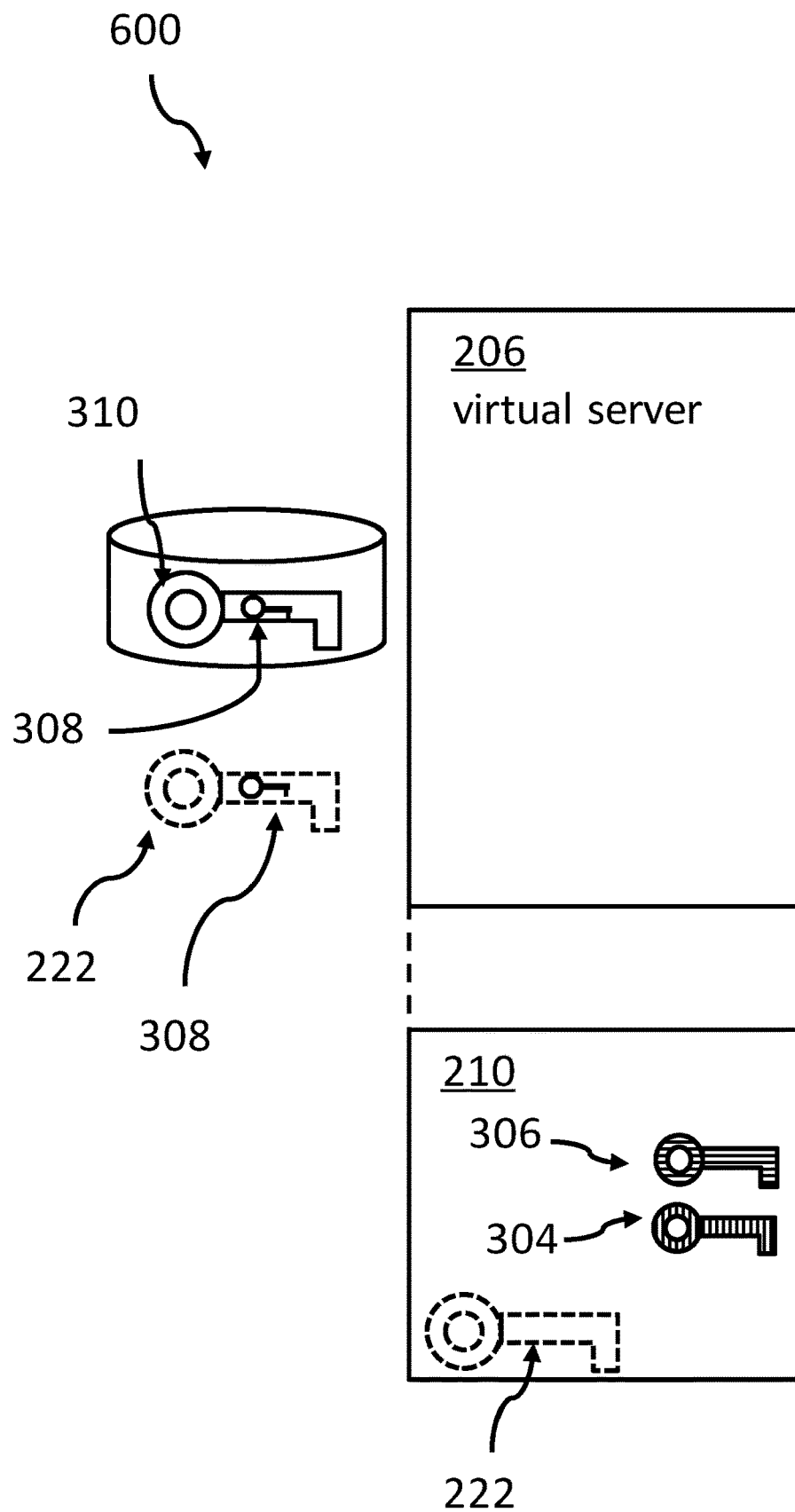
FIG. 6 shows a block diagram of core building blocks of an embodiment of the system for transforming a wrapped key token into a protected key.

FIG. 6 shows a block diagram 600 the virtual server 206 and the virtual server firmware 210 in an initialized form. The virtual server authentication key 306 and the virtual server transport key are shown, as well as the virtual server master key 222.

The virtual server 206 manages the random key 308, which is finally used as data access key to data (not shown) on the virtual server 206. The random key 208 (together with the authentication tag—not shown) is only available persistently—e.g., over a boot cycle of the virtual server—in the form of the wrapped key token 310. As a reminder, the shown outside key with solid lines of the figure structure 310 is the isolated virtual server master key 216.

Additionally, the random key 308—which corresponds to the final data access key—is stored as protected key wrapped by the virtual server master key 222. However, this data access key—e.g., the original random key 308—protected with the virtual server master key 222—is lost after a reboot, because the virtual server master key 222 is regenerated at each boot time of the virtual server 206. Therefore, the persistently stored wrapped key token 310 is sent as part of the second service from the virtual server 206 to the isolated virtual server 204. Based on this second service, the virtual server 206 receives the random key 308 embedded in the virtual server transport key 304, unwraps it, and rewraps the random key 308 with the virtual server master key 222 for the lifetime of virtual server/virtual machine 206.

Figure 7:
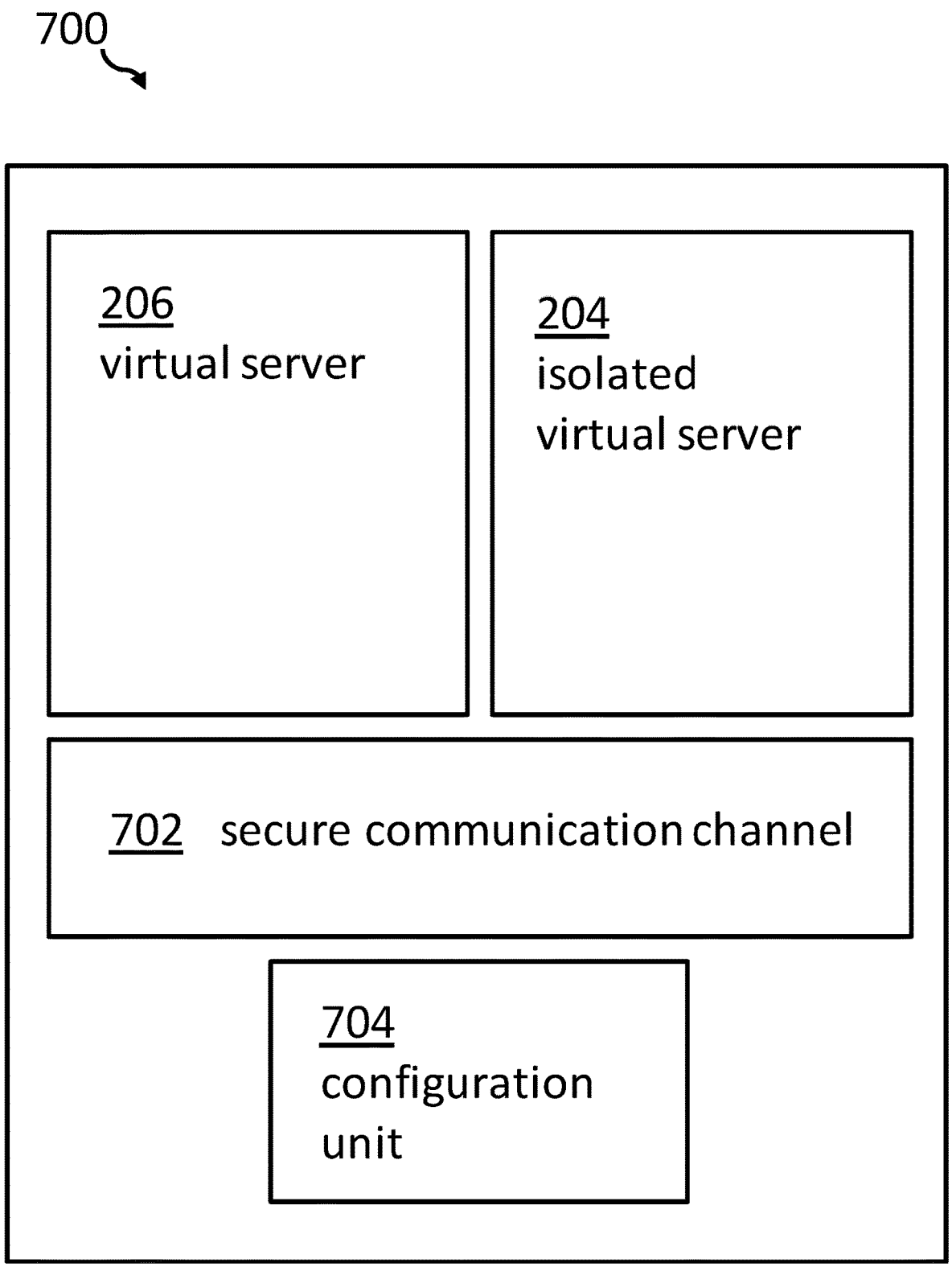
FIG. 7 shows a block diagram of a system for transforming a wrapped key token into a protected key.

FIG. 7 shows a block diagram of the core building blocks of an embodiment of the system 700 for transforming a wrapped key token into a protected key. Again, the protected key is protected by a volatile master key kept in a firmware of the virtual server. The system 700 comprises an isolated virtual server 204 that is adapted for maintaining an isolated virtual server master key, and a virtual server 206. The virtual server and the isolated virtual server are adapted for running on the same hardware firmware, e.g., an extended hypervisor. Thereby, the hardware firmware is adapted for maintaining a volatile virtual server master key for each virtual server.

The system 700 comprises also a configuring unit 704, adapted for configuring an association between the virtual server and the isolated virtual server. The association provides a secret shared by the firmware of the virtual server 206 and the isolated virtual server 204. Also present in the system 700 is a secure communication channel 702 between said virtual server 206 and the isolated virtual server 204, based on said secret.

The isolated virtual server 204 is adapted for providing to the virtual server 206, via a first service, a wrapped key token comprising a random key wrapped by said isolated virtual server master key. The isolated virtual server 204 is also adapted for providing to the virtual server 206, in response to a submission of the wrapped key token via a second service, a protected key. The protected key corresponds to the random key which was wrapped by the isolated virtual server master key.

Also shown is a configuration unit 704 for an initial setup of the system 700. The configuration unit 704 may be implemented as, or as a part of, the management console 302 of FIG. 3.

Figure 8:
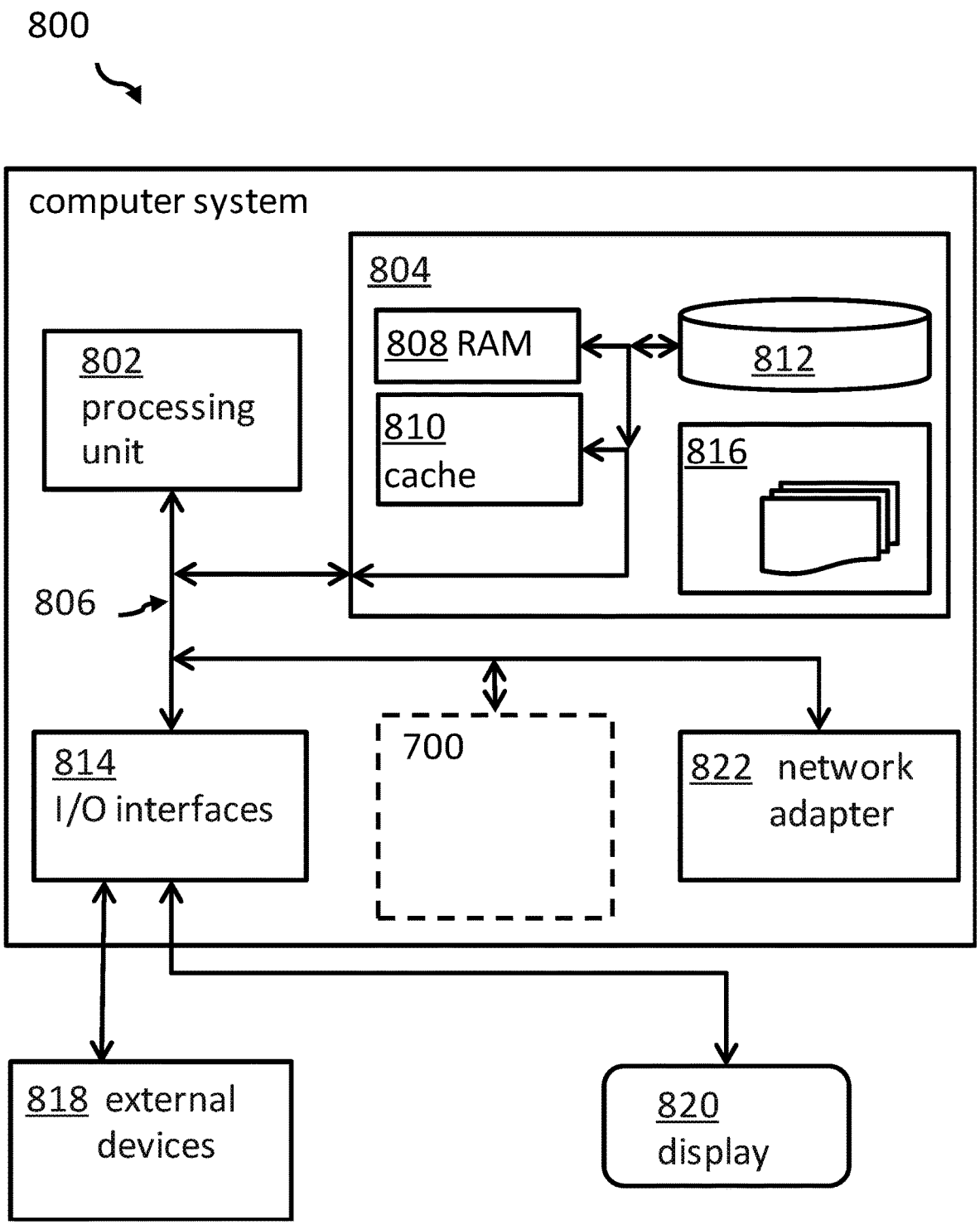
FIG. 8 shows a block diagram of a computing system comprising the system for transforming a wrapped key token into a protected key.

Embodiments of the invention may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system and is not intended to suggest any limitation as to the scope of use or functionality of embodiments of the invention described herein. The computer system 800 is capable of being implemented and/or performing any of the functionality set forth hereinabove. In the computer system 800, there are components which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system executable instructions, such as program modules, being executed by a computer system 800. Generally, program modules may include routines, programs, objects, components, logic, data structures, and so on that perform particular tasks or implement particular data types and/or structures. Computer system/server 800 may be practiced in distributed cloud computing environments where tasks are performed by remote processing devices that are linked through a communications network. In a distributed cloud computing environment, program modules may be located in both local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Furthermore, computer system/server 800 may communicate with one or more networks such as a local area network (LAN), a general wide area network (WAN), and/or a public network (e.g., the Internet) via network adapter 822. As depicted, network adapter 822 may communicate with the other components of computer system/server 800 via bus 806. It should be understood that although not shown, other hardware and/or software components could be used in conjunction with computer system/server 800. Examples include, but are not limited to: microcode, device drivers, redundant processing units, external disk drive arrays, RAID systems, tape drives and data archival storage systems, etc.

As an example, system 700 for transforming a wrapped key token into a protected key may be attached to the bus system 806.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another devices to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method for transforming a wrapped key token into a protected key, which is protected by a volatile master key kept in a firmware of a virtual server, the method comprising:
   creating an isolated virtual server that maintains an isolated virtual server master key;
   creating the virtual server, wherein the virtual server and the isolated virtual server run on the same hypervisor, wherein the hypervisor's firmware maintains a volatile virtual server master key for each virtual server;
   configuring an association between the virtual server and the isolated virtual server, wherein the association provides a secret shared by the firmware of the virtual server and the isolated virtual server;
   establishing a secure communication channel between the virtual server and the isolated virtual server, based on the secret;
   providing to the virtual server, via a first service, a wrapped key token comprising a random key wrapped by the isolated virtual server master key; and
   providing to the virtual server, in response to submitting the wrapped key token, via a second service, the protected key, wherein the protected key corresponds to the random key that was wrapped by the isolated virtual server master key.

2. The method according to claim 1, wherein the first service comprises:
   requesting the wrapped key token, by the virtual server, from the isolated virtual server;
   creating the random key, by the isolated virtual server;
   determining an authentication tag for the random key, using the secret shared by the virtual server and the isolated virtual server;
   wrapping both the random key and the authentication tag with the isolated virtual server master key;
   sending the random key and the authentication tag wrapped with said isolated virtual server master key from the isolated virtual server to the virtual server; and
   receiving, as a token, the random key and the authentication tag wrapped with the isolated virtual server master key by the virtual server.

3. The method according to claim 1, wherein the second service comprises:
   providing the wrapped key token to the virtual server firmware;
   composing, by the virtual server firmware, a request comprising the wrapped key token and a request authentication tag computed using the shared secret;
   sending the request to the isolated virtual server;
   decrypting, by the isolated virtual server, the wrapped key token, resulting in the random key and the authentication tag;
   verifying that the request authentication tag and the authentication tag were created based on the same secret;
   sending, by the isolated virtual server, the random key to the virtual server firmware; and
   encrypting, by the virtual server firmware, the random key with the volatile virtual server master key, resulting in the protected key.

4. The method according to claim 3, wherein the sending, by the isolated virtual server, of the random key to the virtual server firmware comprises:
   encrypting, by the isolated virtual server, the random key with a virtual server transport key that is derived from the secret; and
   decrypting, by the virtual server firmware, the encrypted random key with the virtual server transport key.

5. The method according to claim 4, wherein the computation of the request authentication tag and of the authentication tag for the random key is performed using an authentication key derived from the secret.

6. The method according to claim 1, wherein the random key is erased from the isolated virtual server after the wrapped key token is sent to the virtual server.

7. The method according to claim 1, wherein the virtual server master key is regenerated, by the virtual server firmware, every time the virtual server is booted.

8. The method according to claim 1, wherein the wrapped key token, once received, is persistent in the virtual server, or a related persistent storage.

9. The method according to claim 1, wherein the isolated virtual server master key is kept persistent in a hardware security module.

10. The method according to claim 1, wherein the isolated virtual server master key is virtual server specific.

11. The method according to claim 1, wherein said the service comprises:
   requesting the wrapped key token, by the virtual server, from the isolated virtual server;
   creating the random key by the isolated virtual server;
   sending the random key wrapped with the isolated virtual server master key specific to the virtual server, from the isolated virtual server to the virtual server; and
   receiving, as the wrapped key token, the random key wrapped with said isolated virtual server master key specific to the virtual server, at the virtual server.

12. The method according to claim 1, wherein the second service comprises:
   sending the wrapped key token in an authenticated form from the virtual server to the isolated virtual server;
   decrypting, by the isolated virtual server, the wrapped key token, resulting in the random key, using the isolated virtual server master key specific to the virtual server;
   sending, by the isolated virtual server, the random key to the virtual server firmware; and
   encrypting, by the virtual server firmware, the random key with the volatile virtual server master key, resulting in the protected key.

13. A system for transforming a wrapped key token into a protected key, which is protected by a volatile master key kept in the firmware of a virtual server, the system comprising:
   an isolated virtual server that is adapted for maintaining an isolated virtual server master key;

the virtual server, wherein the virtual server and the isolated virtual server are adapted for running on the same hypervisor, wherein the hypervisor's firmware is adapted for maintaining a volatile virtual server master key for each virtual server, and wherein the hypervisor is communicatively coupled to a processor and a memory with program instructions thereon;

a configuring unit, in communication with the processor and the memory, adapted for configuring an association between the virtual server and the isolated virtual server, wherein the association provides a secret shared by the firmware of both the virtual server and the isolated virtual server;

a secure communication channel between the virtual server and the isolated virtual server, based on the secret;

wherein the isolated virtual server is adapted, by the program instructions on the memory, for providing to the virtual server, via a first service, a wrapped key token comprising a random key wrapped by the isolated virtual server master key; and wherein the isolated virtual server is also adapted, by the program instructions on the memory, for providing to the virtual server, in response to a submission of the wrapped key token, via a second service, the protected key, wherein the protected key corresponds to the random key that was wrapped by the isolated virtual server master key.

14. The system according to claim 13, wherein said first service comprises:

requesting the wrapped key token, by the virtual server, from the isolated virtual server;

creating the random key, by the isolated virtual server;

determining an authentication tag for the random key, using the secret shared by the virtual server and the isolated virtual server;

wrapping both the random key and the authentication tag with the isolated virtual server master key;

sending the random key and the authentication tag wrapped with said isolated virtual server master key from the isolated virtual server to the virtual server; and receiving, as a token, the random key and the authentication tag wrapped with the isolated virtual server master key by the virtual server.

15. The system according to claim 13, wherein said virtual server is also adapted for:

sending said wrapped key token in an authenticated form from said virtual server to said isolated virtual server;

wherein said isolated virtual server is also adapted for decrypting said wrapped key token resulting in said random key and said authentication tag;

wherein said isolated virtual server is also adapted for verifying that an authentication tag of said request and said authentication tag were created based on the same secret;

wherein said isolated virtual server is also adapted for sending said random key to said virtual server firmware which is a portion of said hardware firmware; and wherein said virtual server firmware is also adapted for encrypting said random key with said volatile virtual server master key resulting in said protected key.

16. The system according to claim 13, wherein the virtual server is further adapted for:

providing the wrapped key token to the virtual server firmware;

composing, by the virtual server firmware, a request comprising the wrapped key token and a request authentication tag computed using the shared secret;

sending the request to the isolated virtual server;

wherein the isolated virtual server is also adapted for decrypting the wrapped key token, resulting in the random key and the authentication tag;

wherein the isolated virtual server is also adapted for verifying that the request authentication tag and the authentication tag were created based on the same secret;

wherein the isolated virtual server is also adapted for sending the random key to the virtual server firmware; and wherein the virtual server firmware is also adapted for encrypting the random key with the volatile virtual server master key, resulting in the protected key.

17. The system according to claim 16, wherein the isolated virtual server is adapted for, when sending the random key to the virtual server firmware:

encrypting the random key with a virtual server transport key that is derived from the shared secret; and decrypting, by the virtual server firmware, the encrypted random key with the virtual server transport key.

18. The system according to claim 16, wherein the computation of the request authentication tag and the authentication tag of the random key is performed using an authentication key derived from the secret.

19. The system according to claim 13, wherein the isolated virtual server master key is kept persistent in a hardware security module.

20. A computer program product for transforming a wrapped key token into a protected key which is protected by a volatile master key kept in the firmware of a virtual server, the computer program product comprising a computer readable storage medium having program instructions embodied therewith, the program instructions being executable by a processor of one or more computing systems to cause the one or more computing systems to:

create an isolated virtual server that maintains an isolated virtual server master key;

create the virtual server, wherein the virtual server and the isolated virtual server run on the same hypervisor, wherein hypervisor's firmware maintains a volatile virtual server master key for each virtual server;

configure an association between the virtual server and the isolated virtual server, wherein the association provides a secret shared by the firmware of the virtual server and the isolated virtual server;

establish a secure communication channel between the virtual server and the isolated virtual server, based on the secret;

provide to the virtual server, via a first service, the wrapped key token comprising a random key wrapped by the isolated virtual server master key; and providing to the virtual server, in response to submitting the wrapped key token, via a second service, the protected key, wherein the protected key corresponds to the random key that was wrapped by the isolated virtual server master key.

* * * * *